(12) United States Patent
Toth

(10) Patent No.: US 7,515,995 B2
(45) Date of Patent: Apr. 7, 2009

(54) CONTINUOUS MEDIAN FAILURE CONTROL SYSTEM AND METHOD

(75) Inventor: Carl Raymond Toth, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 11/160,545

(22) Filed: Jun. 28, 2005

(65) Prior Publication Data

US 2006/0291376 A1   Dec. 28, 2006

(51) Int. Cl.
*G06F 19/00* (2006.01)
(52) U.S. Cl. .................................. 700/299; 370/217
(58) Field of Classification Search ............. 700/79–82, 700/21, 20; 702/182–185, 189, 199; 370/217
See application file for complete search history.

(56) References Cited

U.S. PATENT DOCUMENTS

| | | | | |
|---|---|---|---|---|
| 4,423,594 A * | 1/1984 | Ellis | ....................... | 60/39.281 |
| 5,386,441 A | 1/1995 | Erin et al. | ................... | 376/216 |
| 5,715,178 A | 2/1998 | Scarola et al. | .............. | 364/551 |
| 6,047,222 A * | 4/2000 | Burns et al. | ................... | 700/79 |
| 6,768,949 B2 | 7/2004 | Shupe et al. | .................. | 702/33 |
| 7,089,530 B1 * | 8/2006 | Dardinski et al. | ........... | 717/105 |
| 2005/0228619 A1 * | 10/2005 | Burnet et al. | ............... | 702/189 |
| 2006/0090942 A1 * | 5/2006 | Hastings | .................... | 180/68.1 |

* cited by examiner

*Primary Examiner*—Kidest Bahta
(74) *Attorney, Agent, or Firm*—Cantor Colburn LLP

(57) ABSTRACT

A redundant control system including at least three redundant signals is presented. The redundant control system includes a failure circuit associated with each of the redundant signals. The failure circuit generates a failure signal in response to an occurrence of a failure of a corresponding one of the redundant signals. A select circuit is associated with each of the redundant signals. The select circuit is receptive to a default signal associated with the corresponding one of the redundant signals, to the failure signal, and to the corresponding one of the redundant signals. The select circuit selects the default signal when the failure signal indicates a failure of the corresponding one of the redundant signals and selects the corresponding one of the redundant signals when the failure signal does not indicate a failure for the corresponding one of the redundant signals. A median determination circuit is receptive to the default signals selected and the redundant signals selected to determine a median signal indicative of a median of the default signals selected and the redundant signals selected.

15 Claims, 6 Drawing Sheets ically to a redundant control system and method. More specifically, the present invention relates to a modular redundant control system and method that avoids abrupt changes in control signals, which are commonly encountered with a degradation of a transmitter (or sensor) signal or failure of a transmitter (or sensor) in present redundant systems.

CONTINUOUS MEDIAN FAILURE CONTROL SYSTEM AND METHOD

BACKGROUND

The present invention relates generally to a redundant control system and method. More specifically, the present invention relates to a modular redundant control system and method that avoids abrupt changes in control signals, which are commonly encountered with a degradation of a transmitter (or sensor) signal or failure of a transmitter (or sensor) in present redundant systems.

Typically, redundant control systems include at least two transmitters (or sensors) in communication with a controller to protect against transmitter (or sensor) signal degradation or transmitter (or sensor) failure that may cause a disruption of the turbine control system. In such system a control signal is derived by determining a median signal of the transmitters' (or sensors') signals. However, this approach results in abrupt changes in the control signal, which often results in undesirable disruptions in the control system operation, sometimes referred to as "bumps" in turbine control systems.

Another approach is described in U.S. Pat. No. 5,715,178 to Scarola et al., which discloses an algorithm that averages outputs of sensors measuring the same parameter to provide an averaged (or mean) sensor output, which is compared to the original sensor outputs. When the deviation between the averaged sensor output and any one of the original sensor outputs is too great, the sensor output with the greatest deviation is removed from the calculation. This process is repeated until all the remaining sensor outputs in the calculation are within an acceptable deviation of the averaged sensor output; thereafter the averaged sensor output is utilized in the system. This approach also results in abrupt changes in the signal utilized in the system, which often results in undesirable disruptions in the system operation.

SUMMARY

In one exemplary embodiment of the invention a redundant control system including at least three redundant signals is presented. The redundant control system includes a failure circuit associated with each of the redundant signals. The failure circuit generates a failure signal in response to an occurrence of a failure of a corresponding on or the redundant signals. The redundant control system further includes a select circuit associated with each of the redundant signals. The select circuit is receptive to a default signal associated with the corresponding one of the redundant signals, to the failure signal, and to the corresponding one of the redundant signals. The select circuit selects the default signal when the failure signal indicates a failure of the corresponding one of the redundant signals and selects the corresponding one of the redundant signals when the failure signal does not indicate a failure for the corresponding one of the redundant signals. The redundant control system still further includes a median determination circuit that is receptive to the default signals selected and the redundant signals selected to determine a median signal indicative of a median of the default signals selected and the redundant signals selected.

In another exemplary embodiment of the invention a redundant control method including at least three redundant signals is also presented. The redundant control method includes determining an occurrence of a failure of any one of the redundant signals. The redundant control method further includes for each of the redundant signals, selecting a default signal associated with the corresponding one of the redundant signals when a failure of the corresponding one of the redundant signals has been determined and selecting the corresponding one of the redundant signals when a failure of the corresponding one of the redundant signals has not been determined. The redundant control method also includes determining a median signal of the default signals selected and the redundant signals selected In yet another exemplary embodiment of the invention a redundant control system including at least three redundant signals is presented. The redundant control system includes means for determining an occurrence of a failure of any one of the redundant signals. The redundant control system further includes means for selecting, associated with each of the redundant signals, a default signal associated with the corresponding one of the redundant signals when a failure of the corresponding one of the redundant signals has been determined and the corresponding one of the redundant signals when a failure of the corresponding one of the redundant signals has not been determined. The redundant control system still further includes means for determining a median signal of the default signals selected and the redundant signals selected.

BRIEF DESCRIPTION OF THE DRAWINGS

These and other features, aspects, and advantages of the present invention will become better understood when the following detailed description is read with reference to the accompanying figures, wherein.

DETAILED DESCRIPTION

Figure 1:
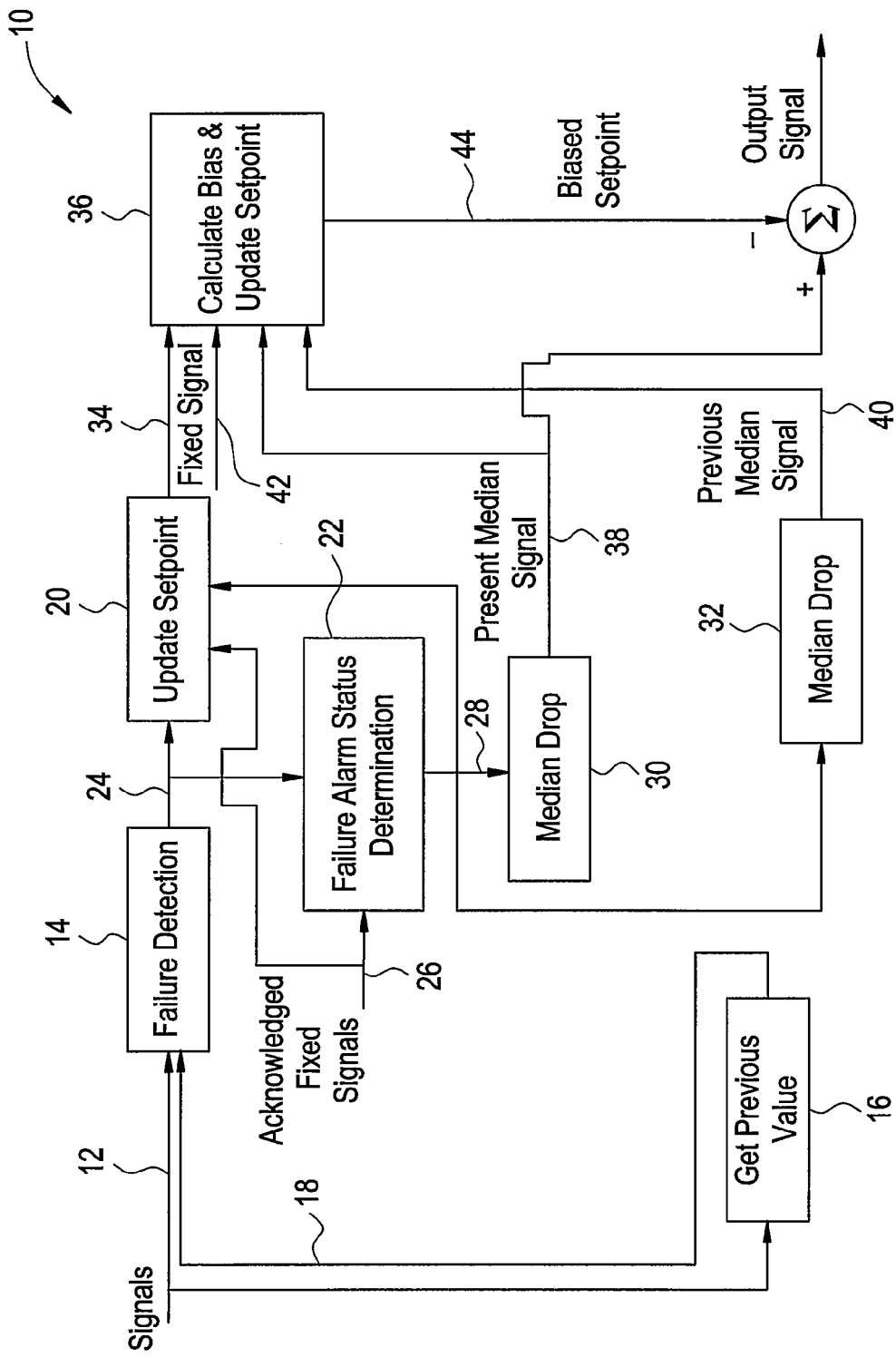
FIG. 1 is a block diagram of an exemplary embodiment of a continuous median failure control system in accordance with the present invention.

Referring to FIG. 1, a block diagram of an exemplary embodiment of a continuous median failure control system for use in a redundant turbine control system is generally shown at 10. Signals from redundant transmitters (the transmitters are not shown, but include pressure transducers, flow transducers, and other devices that transmit signals where redundancy would be advantageous in a system) are presented at signal buss or lines 12, referred to herein as "present transmitter signals". While only a single line is used herein to illustrate a bus or a plurality of signal lines, it is intended that each signal be associated with an individual conductor of the bus or an individual signal line. Nevertheless, it is also within the scope of the present invention that know multiplexing techniques could be employed to carry multiple signals over a single conductor. These transmitter signals are presented to a Failure Detection function (circuit) 14 and a Get Previous Value function (circuit) 16. Get Previous Value function 16 stores a record of previous transmitter signal values of the transmitter signals that it receives. These previous transmitter signal values are then presented to the Failure Detection function 12 by buss or signal lines 18. Failure Detection function 14 compares each of the present transmitter signals with the corresponding (i.e., corresponding to each of the transmitters) previous transmitter signals, whereby a failure is detected when a difference is outside respective limits. Failure Detection function 14 is discussed in more detail hereinafter with reference to FIG. 2. Failure Detection function 14 provides corresponding failure detection signals ("Failure High" and "Failure Low" signals) in response to these comparisons, which are presented to an Update Setpoint Status function (circuit) 20 and a Failure Alarm Status Determination function (circuit) 22 by a buss or signal lines 24. Failure Alarm Status Determination function 22 receives Acknowledged Fixed signals, indicative of corresponding transmitter signals that are provided for a safe mode of operation for the system, presented at bus or signal lines 26. Failure Alarm Status Determination function 22 employs a logic circuit to provide corresponding alarm signals indicating that a failure has occurred. "High Failure" and "Low Failure" signals are generated by the logic circuit of the Failure Alarm Status Determination function 22 and are presented at bus or signal lines 28 to Update Setpoint Status function 20, a Median Drop function (circuit 30, and a Median Drop function (circuit) 32. Failure Alarm Status Determination function 22 is discussed in more detail hereinafter with reference to FIG. 4. Update Setpoint Status function 20 employs a logic circuit to provide corresponding "Failure" signals (regardless if it was a high failure or a low failure) at buss or signal lines 34, indicating that a setpoint (e.g., an operational parameter) requires updating. These Failure signals are presented to a Calculate Bias and Update Setpoint function (circuit) 36 by buss or signal lines 34. The Update Setpoint Status function 20 is discussed in more detail hereinafter with reference to FIG. 3. The Median Drop functions 30 and 32 determine Present (presented at buss or signal lines 38) and Previous (presented at buss or signal lines 40) Median signal values for the transmitter signals that have not failed. The Present and Previous Median signal values are presented to Calculate Bias and Update Setpoint function 36 by buss or signal lines 38 and 40, respectively. The median Drop functions 30 and 32 are discussed in more detail (although only one is discussed as the same arrangement is applicable to both) hereinafter with reference to FIG. 6.

Calculate Bias and Update Setpoint functions 36 receives a Fixed (setpoint) signal as an input at signal line 42. The Present and Previous median signal values and the Failure signals are utilized to update a setpoint, resulting in the Biased Setpoint presented at signal line 44. Calculate Bias and Update Setpoint function 36 is discussed in more detail hereinafter with reference to FIG. 5. The Bias Signal and the Present Median signal are combined to determine a difference at a Summer function (circuit) 46, resulting in an Output signal presented at signal line 48.

Figure 2:
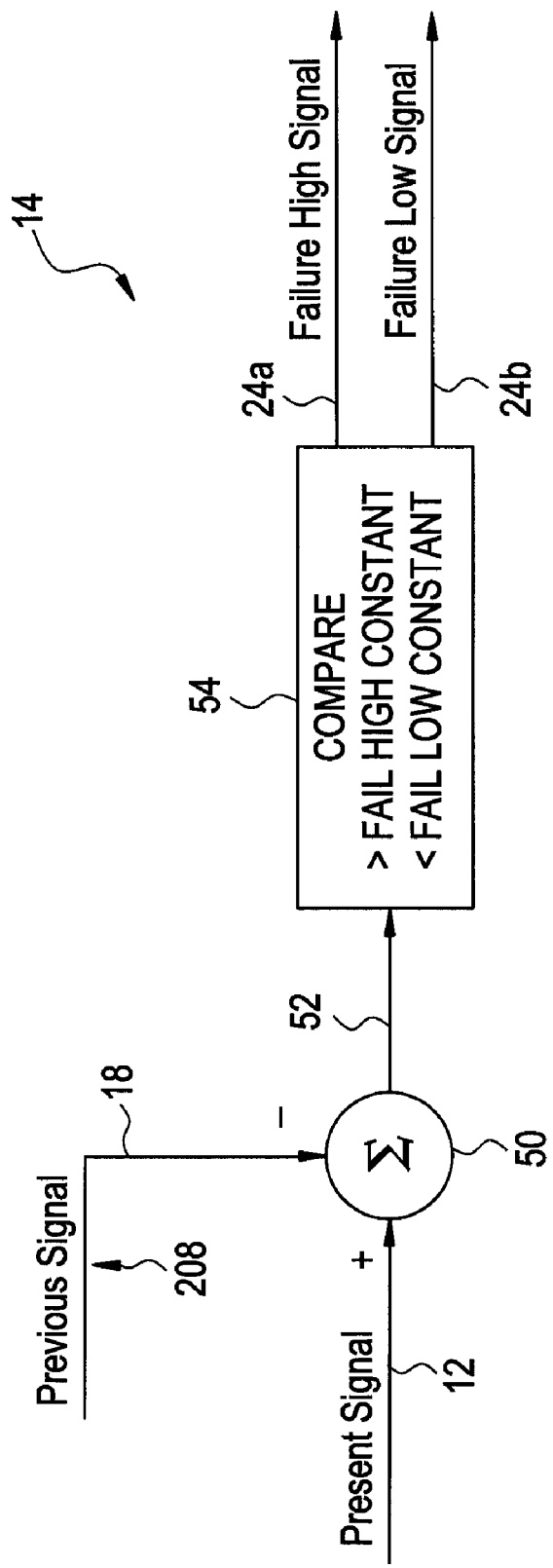
FIG. 2 is a block diagram of a Failure Detection function of the system of FIG. 1.

Referring now to Fig. 2, Failure Detection function 14 is generally shown. While FIG. 2 only shows the configuration for one of the transmitter signals, it will be appreciated that the configuration is applicable for each of the other redundant transmitter signals. The present transmitter signal presented at signal line 12 and the previous transmitter signal presented at signal line 18 are compared at a Summer function (circuit) 50, resulting in a difference at a signal line 52. This difference is presented to a Compare function (circuit) 54, which compares the difference to determine if it is greater than a Failure High Constant limit or less than a Failure High Constant limit. Compare function 54 may simply comprise a comparator as is well know. When this difference is greater than the Failure High Constant limit the Failure High signal is set (at signal line 24a of signal lines 24) and when this difference is less than the Failure High Constant limit the Failure Low signal is set (at signal line 24b of signal lines 24).

Figure 3:
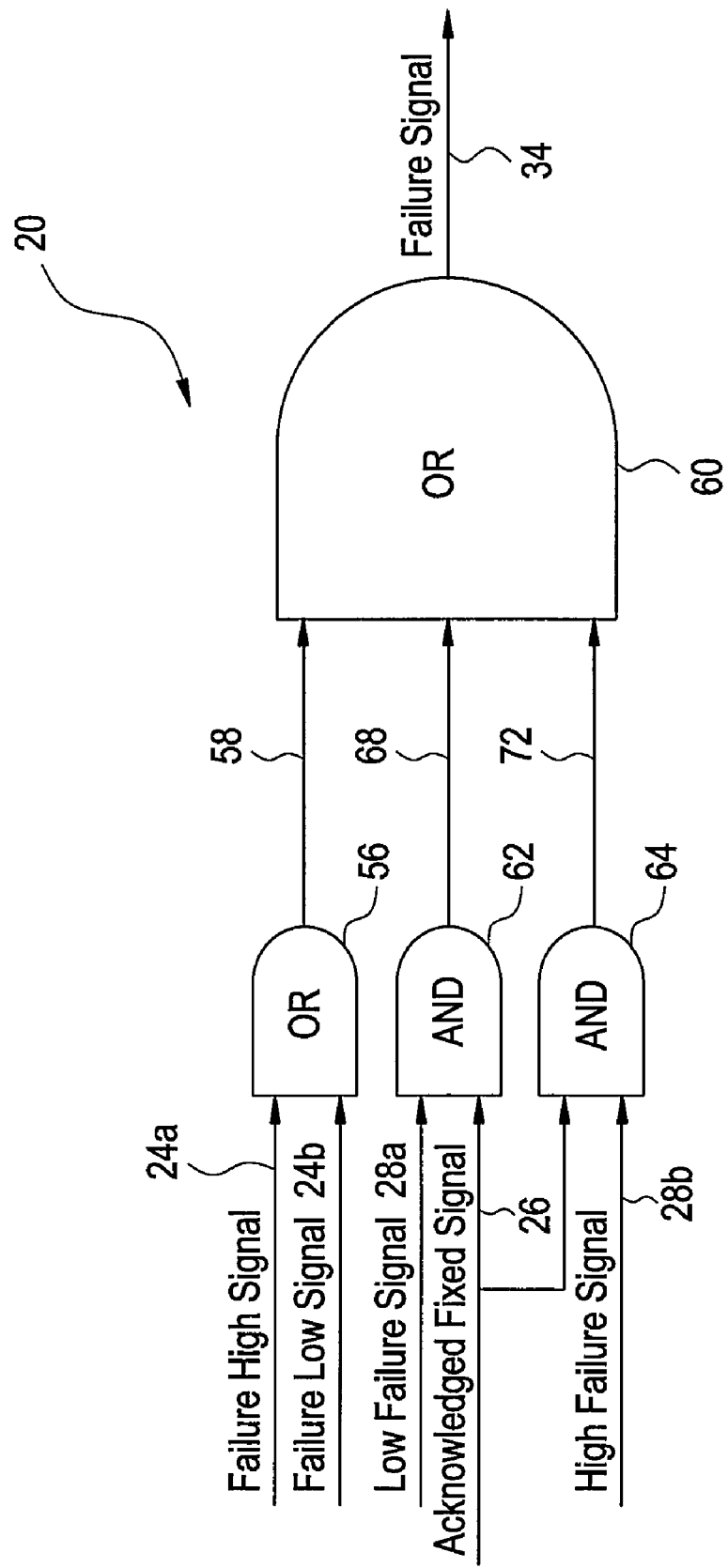
FIG. 3 is a block diagram of an Update Setpoint function of the system of FIG. 1.

Referring to FIG. 3, Update Setpoint Status function 20 is generally shown. While FIG. 3 only shows the configuration for one of the transmitter signals, it will be appreciated that the configuration is applicable for each of the other redundant transmitter signals. The Failure High signal (at signal line 24a) and the Failure Low signal (at signal line 24b) are inputs to a logic OR gate 56, with the output thereof (at a signal line 58) input to an logic OR gate 60. The Acknowledged Fixed signal (at signal line 26) is an input to logic AND gates 62 and 64. The Low Failure signal at signal line 28a is also an input to logic AND gate 62, with the output thereof (at a signal line 68) input to logic OR gate 60. The High Failure signal at a signal line 28b is also an input to logic AND gate 64, with the output thereof (at a signal line 72) input to logic OR gate 60. The output of logic OR gate 60 is the Failure signal at signal line 34.

Figure 4:
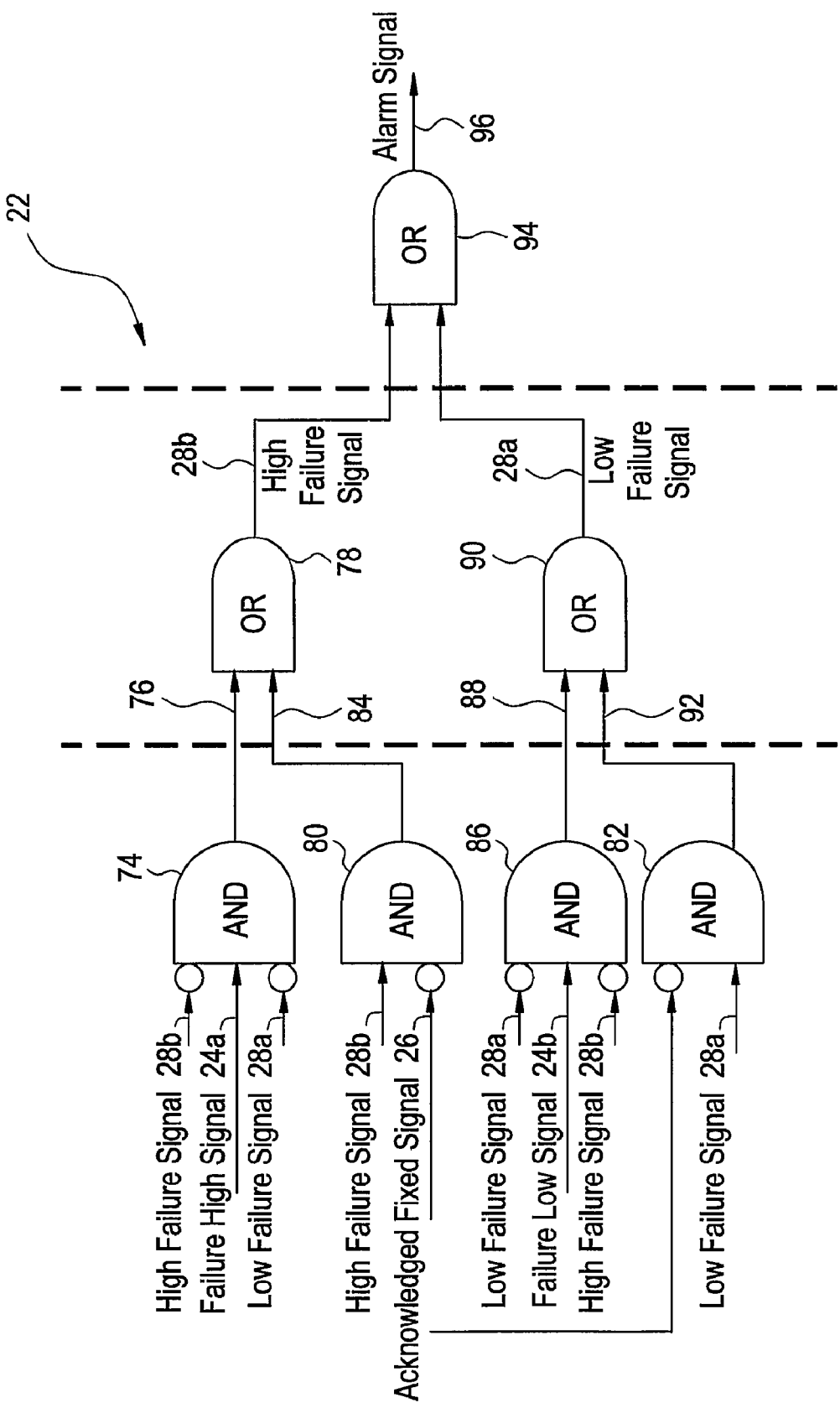
FIG. 4 is a block diagram of a Failure Alarm Status Determination function of the system of FIG. 1.

Referring now to FIG. 4, Failure Alarm Status Determination function 22 is generally shown. While FIG. 4 only shows the configuration for one of the transmitter signals, it will be appreciated that the configuration is applicable for each of the other redundant transmitter signals. The Failure High signal (at signal line 24a )is an input to a logic AND gate 74. The High Failure signal (at signal line 28b) is also an input (at an inverted input) to logic AND gate 74. The Low Failure signal (at signal line 28a) is also an input (at an inverted input) to logic AND gate 74. The output of logic AND gate 74 (at a signal line 76) is input to a logic OR gate 78. The Acknowledged Fixed signal (at signal line 26) is an input (at an inverted input) to logic AND gates 80 and 82. The High Failure signal is also an input to logic AND gate 80, with the output thereof (at a signal line 84 input to logic OR gate 78. The output of logic OR gate 78 is the High Failure signal at line 28b. The Failure Low signal (at signal line 24b)is an input to a logic AND gate 86. The High Failure signal is also an input (at an inverted input) to a logic AND gate 86. The Low Failure signal is also an input (at an inverted input) to logic AND gate 86. The output of logic AND gate 86 (at a signal line 88) is input to a logic OR gate 90. The Low Failure signal is also an input to logic AND gate 82, with the output thereof (at a signal line 92) input to logic OR gate 90. The output of logic OR gate 90 is the Low Failure signal at line 28a. The High Failure and Low Failure signals are inputs to a logic OR gate 94, with the output thereof being the alarm signal (at a signal line 96). It will be appreciated that since the foregoing is a cascaded arrangement of logic gates, it may require one or more clock cycles for the alarm signal to be updated.

Figure 5:
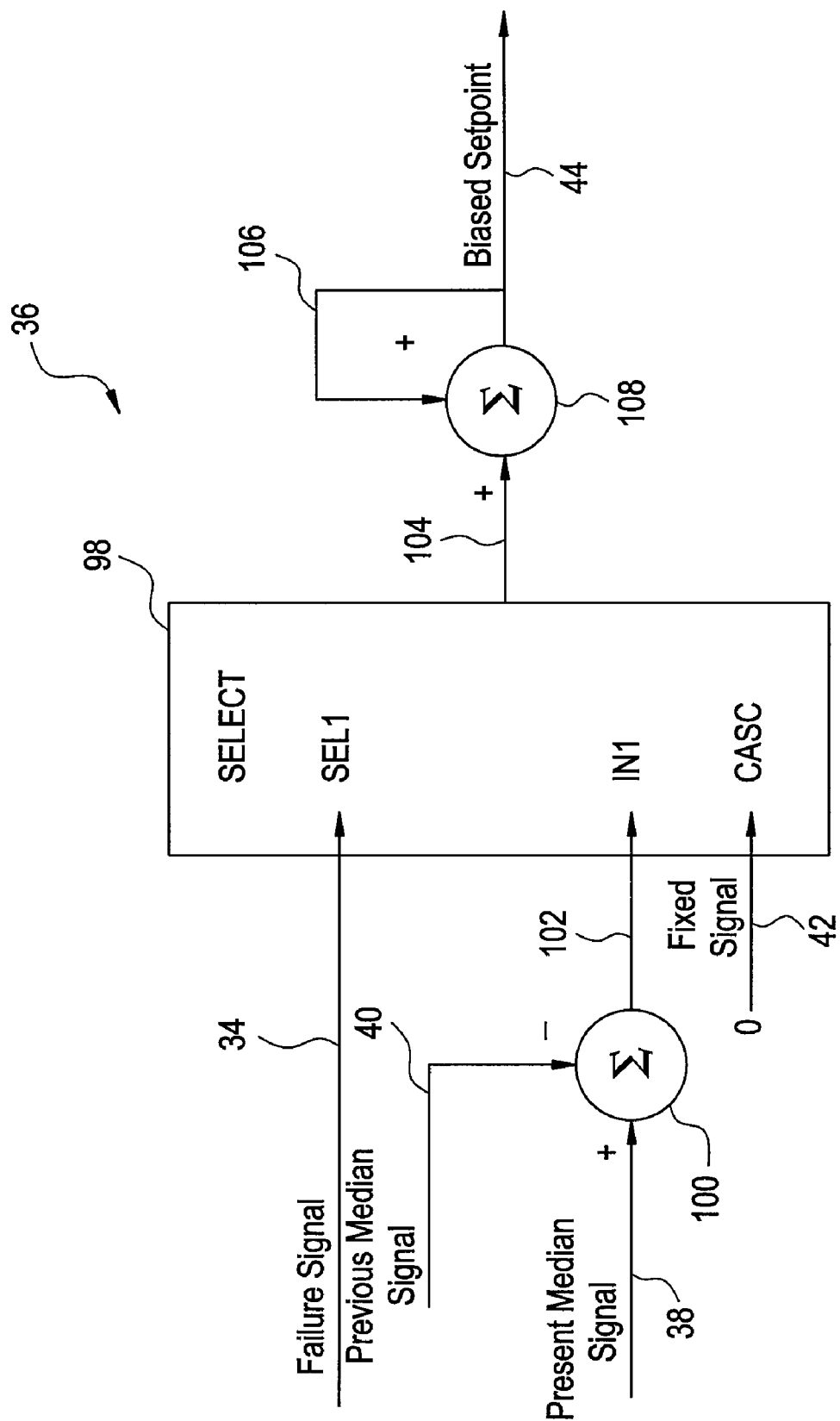
FIG. 5 is a block diagram of a Calculate Bias function of the system of FIG. 1.

Referring now to FIG. 5, Calculate Bias and Update Setpoint function 36 is generally shown. The Failure signals from update Set Point Status function 20 are input to a logic OR gate (not shown) to generate a single Failure signal, whenever there is a failure. This single Failure signal (at signal line 34) is an input at the select or enable input of a Select function (circuit) 98. Select function 98 may comprise a select or gate integrated circuit that simply pass an input to the output when enabled, as is known. The Present Median signal (at signal line 38) and the Previous median signal (at signal line 40) are combined at a Summer function (circuit) 100 to provide a difference at a signal line 102. This difference signal is passed through to the output (at a signal line 104) of Select function 98 when selected, i.e., the Failure signal indicates a failure. Otherwise the output is set to zero (i.e., the Fixed signal), at signal line 42. This difference signal (which can be positive or negative) when selected becomes a Bias signal (at a signal line 104), which is added to the current Setpoint (at a signal line 106) at a Summer function (circuit)

108. This combined signal, i.e., the Biased Setpoint signal from Summer function 108 is presented at signal line 44. The Biased Setpoint becomes the Setpoint. This is an important feature as use of this Biased Signal in conjunction with the changing Present Median avoids abrupt changes in the Output Signal. This assures a smooth transmission during a failure, as compared to the abrupt (or bump) changes encountered in the prior art systems.

Figure 6:
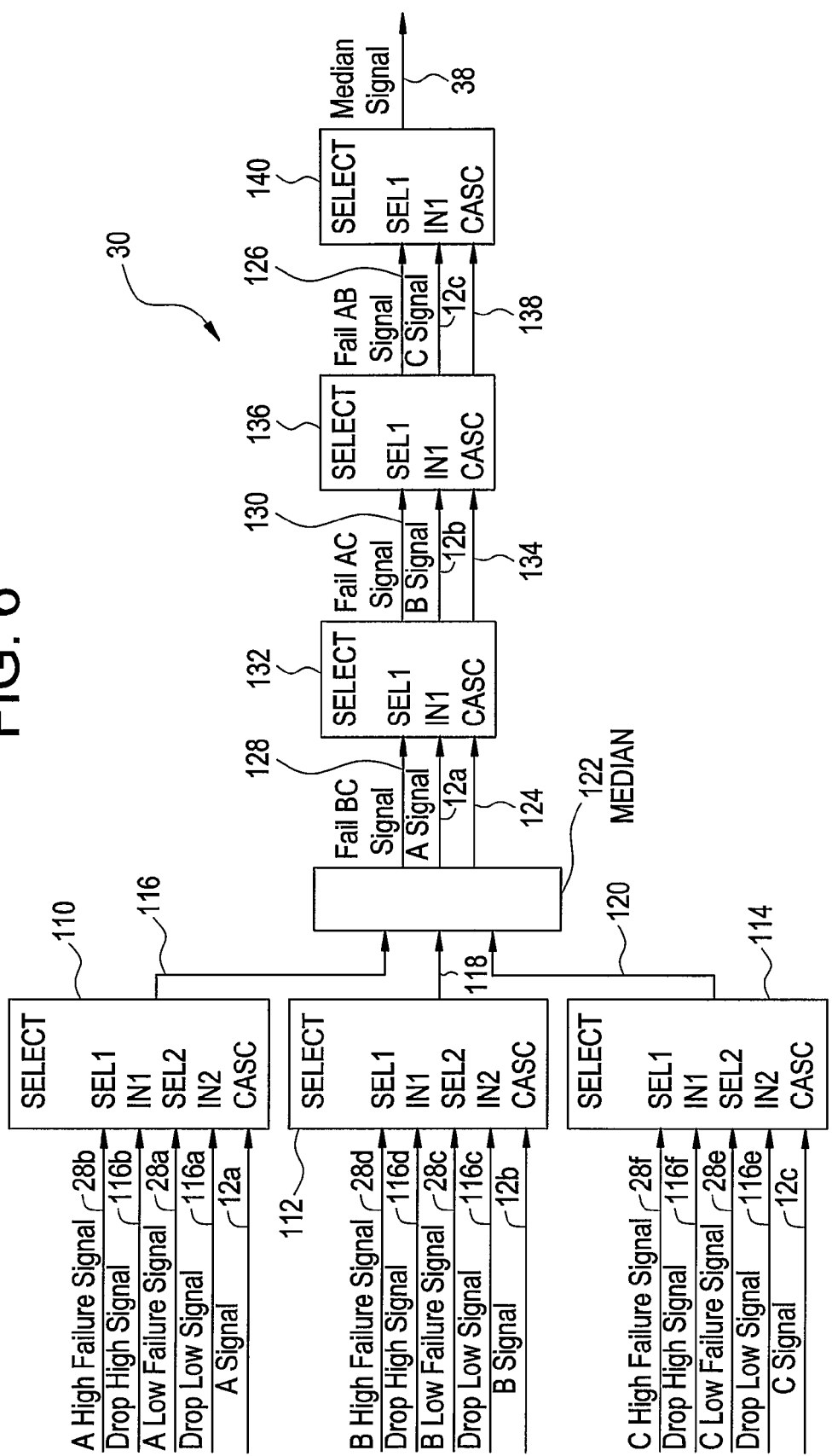
FIG. 6 is a block diagram of a Median Drop function of the system of FIG. 1.

Referring now to FIG. 6, Median Drop function 30 is generally show, with Median Drop function 32 having essentially the same configuration. The High Failure and Low Failure signals generated by the logic circuit of the Failure Alarm Status Determination function 22 are presented at signal lines 28a-f to for each of the transmitter signals (in this example there is three transmitters). These High Failure and Low Failure signals are input to select inputs of Select functions (circuits) 110, 112, and 114. A "Drop High" signal and a "Drop Low" signal are provided for each of the transmitter signals at signal lines 116a-f. The Drop High and Drop Low signals are default safe mode signals for each type of failure, i.e., high or low. These default signals are set to assure safe mode operation of the system, in other words they are selected to be outside of the normal range of the transmitter signal levels. Setting the Drop signals outside the normal range of the transmitter signal levels ensures that the Drop signals will not be included in the calculation of the median. These Drop High and Drop Low signals are input to inputs of the Select functions. For each of the Select Functions, when a High Failure signal is set, the select input of the Select function in enabled, thereby passing the Drop High signal to an output of the Select function. Further, when a Low Failure signal is set, the select input of the Select function in enabled, thereby passing the Drop Low signal to an output of the Select function. Otherwise, the present transmitter signal (at respective signal line 1a-c) is passed to the output of the Select function. These output signals are present at signal lines 116, 188, and 120 for Select function 110, 112, and 114, respectively, to inputs of a Median function (circuit) 122. The Median function 122 calculates the median of the inputs and presents a Median signal at an output thereof at a signal line 124.

Referring also to FIG. 3, the Failure signal at line 34 is generated for each of the transmitter signals, corresponding Update Set Point Status functions 20. The Failure signals indicated a failure (high or low) for each corresponding transmitter signals. For purposes of this discussion, the three transmitter signals will be referred to A, B, and C. The Failure signals for A and B are combined by, e.g., an AND gate (not shown) to provide a FailAB signal at a signal line 126, whereby FailAB is set when both transmitter signals associated with transmitter signals A and B fail. The Failure signals for B and C are combined by, e.g., an AND gate (not shown) to provide a FailBC signal at a signal line 128, whereby FailBC is set when both transmitter signals associated with transmitter signals B and C fail. The Failure signals for A and C are combined by, e.g., an AND gate (not shown) to provide a FailAC signal at a signal line 130, whereby FailAC is set when both transmitter signals associated with transmitter signals A and C fails.

The FailBC signal is input to a select input of a Select function (circuit) 132. The present transmitter signal for transmitter signal A is input to an input of the Select function 132. When the FailBC signal is set, the select input of the Select function 132 in enabled, thereby passing the present transmitter signal A to an output of the Select function 132, at a signal line 134. Otherwise, the Median signal (at signal line 124) is passed to the output (at signal line 134) of the Select function 132. The FailAC signal is input to a select input of a Select function 126. The present transmitter signal for transmitter signal B is input to an input of the Select function 136. When the FailAC signal is set, the select input of the Select function 136 in enabled, thereby passing the present transmitter signal B to an output of the Select function 136, at a signal line 138. Otherwise the output signal from the Select function 132 (at signal line 134) is passed to the output (at signal line 138) of the Select function 136. The FailAB signal is input to a select input of a Select function (circuit) 140. The present transmitter signal for transmitter signal C is input to an input of the Select function 140. When the FailAB signal is set, the select input of the Select function 140 in enables, thereby passing the present transmitter signal C to an output of the Select function 140, at signal line 38. Otherwise, the output signal from the Select function 136 (at signal line 138) is passed to the output (at signal line 28) of the Select function 140.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A redundant control system including at least three redundant signals, comprising:

at least three failure circuits, each individual one of said at least three failure circuits being associated with an individual one of said at least three redundant signals, said failure circuit generating a failure signal in response to an occurrence of a failure of a corresponding one of the redundant signals;

a first select circuit associated with each of the redundant signals, said first select circuit receptive to a default signal associated with the corresponding one of the redundant signals, to said failure signal, and to the corresponding one of the redundant signals, said first select circuit selecting said default signal when said failure signal indicates a failure of the corresponding one of the redundant signals, said first select circuit selecting the corresponding one of the redundant signals when said failure signal does not indicate a failure for the corresponding one of the redundant signals; and a median determination circuit receptive to said default signals selected and the redundant signals selected to determine a median signal indicative of a median of said default signals selected and the redundant signals selected.

2. The redundant control system of claim 1 wherein each of said failure circuits comprises:

a summation circuit receptive to a present signal of the corresponding one of the redundant signals and a previous signal of the corresponding one of the redundant signals, said summation circuit combining said present signal of the corresponding one of the redundant signals and said previous signal of the corresponding one of the redundant signals to provide a difference signal thereof; and a compare circuit receptive to said difference signal, said compare circuit comparing said difference signal to a constant to generate said failure signal when the difference signal is one of (1) greater than and (2) less than said constant.

3. The redundant control system of claim 1 wherein each of said failure circuits further comprises:
an alarm circuit generating an alarm signal in response said failure signal.

4. The redundant control system of claim 2 wherein said failure signal is also generated when a fixed signal is used for any one of the redundant signals.

5. The redundant control system of claim 2 wherein:
said constant comprises a high constant and a low constant; and
said default signal comprises a high level default signal when said difference signal is greater than said high constant and a low level default signal when said difference signal is less than said low constant.

6. The redundant control system of claim 1 further comprising;
a second select circuit receptive to a present signal of each of the redundant signals, to said median signal, and to a signal indicative of an occurrence of all but one of said failure signals indicating failures of all but one of said the redundant signals, said second select circuit selecting a corresponding one of said present signals corresponding to said one of the redundant signals that is the only one of the redundant signals for which said failure signal does not indicate a failure of the corresponding one of the redundant signals as said median signal when said signal indicative of an occurrence of all but one of said failure signals indicates failures of all but one of said the redundant signals, said second select circuit selecting said median signal otherwise.

7. The redundant control system of claim 1 wherein said median signal comprises a present median signal of said median signal as determined from present signals of the redundant signals and a previous median signal of said median signal as determined from previous signals of the redundant signals, and further comprising:
a summation circuit receptive to said present median signal and said previous median signal, said summation circuit combining said present median signal and said previous median signal to provide a difference signal thereof; and
a second select circuit receptive to said difference signal and to a signal indicative of an occurrence of any one of said failure signals indicating a failure of any one of said the redundant signals, said second select circuit selecting said difference signal as a second select output signal when said signal indicative of said occurrence of any one of said failure signals indicates a failure of any one of said the redundant signals, said second select circuit selecting a fixed signal as said second select output signal otherwise.

8. The redundant control system of claim 7 further comprising:
a summation circuit receptive to said second select output signal and to said median signal, said summation circuit combining said second select output signal and said median signal to provide a redundant control system output.

9. A redundant control method including at least three redundant signals, comprising:
determining an occurrence of a failure of any one of the redundant signals;
for each of the redundant signals, selecting a default signal associated with the corresponding one of the redundant signals when a failure of the corresponding one of the redundant signals has been determined;
for each of the redundant signals, selecting the corresponding one of the redundant signals when a failure of the corresponding one of the redundant signals has not been determined; and
determining a median signal of said default signals selected and the redundant signals selected;
wherein said median signal comprises a present median signal of said median signal as determined from present signals of the redundant signals and a previous median signal of said median signal as determined from previous signals of the redundant signals, and further comprising:
combining said present median signal and said previous median signal to provide a difference signal thereof; and
selecting said difference signal when a failure of said the redundant signals has been determined; and
selecting a fixed signal when a failure of said the redundant signals has not been determined; and
combining one of said difference signal selected and said fixed signal selected with said median signal to provide a redundant control system output.

10. The redundant control method of claim 9 wherein said determining an occurrence of a failure comprises:
for each of the redundant signals, combining a present signal of the corresponding one of the redundant signals and a previous signal of the corresponding one of the redundant signals to provide a difference signal thereof; and
for each of the redundant signals, comparing said difference signal to a constant to generate said failure signal when the difference signal is one of (1) greater than and (2) less than said constant.

11. The redundant control method of claim 9 further comprising:
generating an alarm signal when a failure of any one of the redundant signals has been determined.

12. The redundant control method of claim 10, wherein said determining an occurrence of a failure further comprises:
determining an occurrence of a failure when a fixed signal is used for any one of the redundant signals.

13. The redundant control method of claim 10 wherein:
said constant comprises a high constant and a low constant; and
said default signal comprises a high level default signal when said difference signal is greater than said high constant and a low level default signal when said difference signal is less than said low constant.

14. The redundant control method of claim 9 further comprising;
selecting a present signal corresponding to one of the redundant signals when that corresponding one of the redundant signals is the only one of the redundant signals for which said failure has not been determined, wherein said present signal selected is utilized as said median signal; and
selecting said median signal when said failure has been determined for more than one of the redundant signals.

15. A redundant control system including at least three redundant signals, comprising:
means for determining an occurrence of a failure of any one of the redundant signals;
first means for selecting associated with each of the redundant signals, said first means for selecting a default signal associated with the corresponding one of the redundant signals when a failure of the corresponding one of the redundant signals has been determined, said first means for selecting the corresponding one of the redundant signals when a failure of the corresponding one of the redundant signals has not been determined; and means for determining a median signal of said default signals selected and the redundant signals selected, wherein said means for determining comprises:

means for combining associated with each of the redundant signals, said means for combining a present signal of the corresponding one of the redundant signals and a previous signal of the corresponding one of the redundant signals to provide a difference signal thereof; and means for comparing associated with each of the redundant signals, said means for comparing said difference signal to a constant to generate said failure signal when the difference signal is one of (1) greater than and (2) less than said constant;

means for determining an occurrence of a failure when a fixed signal is used for any one of the redundant signals; and means for generating an alarm signal when a failure of any one of the redundant signals has been determined.

* * * * *